US012789709B2

(12) United States Patent
Woo et al.

(10) Patent No.: US 12,789,709 B2
(45) Date of Patent: Nov. 10, 2026

(54) TWO-WAY OPENABLE CONSOLE

(71) Applicants: Hyundai Motor Company, Seoul (KR); Kia Corporation, Seoul (KR); DAYOU EP CO., LTD., Busan (KR)

(72) Inventors: Jung Hoon Woo, Suwon-si (KR); Kwan Woo Lee, Suwon-si (KR); Dae Hee Lee, Incheon (KR); Hong Sik Chang, Hwaseong-Si (KR); Sang Jin Joung, Ulsan (KR); Kyoung Sik Kim, Suwon-Si (KR); Seol Wan Park, Seoul (KR); Nam Su Park, Suwon-si (KR); Hong Kil Noh, Asan-Si (KR)

(73) Assignees: Hyundai Motor Company, Seoul (KR); Kia Corporation, Seoul (KR); DAYOU EP CO., LTD., Busan (KR)

( * ) Notice: Subject to any disclaimer, the term of this patent is extended or adjusted under 35 U.S.C. 154(b) by 320 days.

(21) Appl. No.: 18/531,338

(22) Filed: Dec. 6, 2023

(65) Prior Publication Data

US 2025/0001945 A1 Jan. 2, 2025

(30) Foreign Application Priority Data

Jun. 27, 2023 (KR) ........................ 10-2023-0082578

(51) Int. Cl.
*E05B 83/32* (2014.01)
*B60R 7/04* (2006.01)
*E05D 7/02* (2006.01)

(52) U.S. Cl.
CPC ...................................... *B60R 7/04* (2013.01)

(58) Field of Classification Search
CPC .... B60R 2011/0007; B60R 7/04; E05B 83/32
USPC ................... 296/24.34, 1.09, 37.8, 153, 37.5
See application file for complete search history.

(56) References Cited

U.S. PATENT DOCUMENTS

2019/0063132 A1* 2/2019 Ike .......................... B60R 11/00
2020/0156552 A1* 5/2020 Yoshida ................. B60N 2/793
2023/0294580 A1* 9/2023 Kim ....................... B60N 2/793
2023/0294581 A1* 9/2023 Kim ....................... B60N 2/793
2023/0302977 A1* 9/2023 Kim .......................... B60R 7/04
(Continued)

FOREIGN PATENT DOCUMENTS

KR 2003-0086806 A 11/2003
KR 2004-0021034 A 3/2004
KR 100930757 B1 * 12/2009 ............. E05B 83/32

*Primary Examiner* — Vivek D Koppikar
*Assistant Examiner* — Daniel Guang-Dian Chen
(74) *Attorney, Agent, or Firm* — MORGAN, LEWIS & BOCKIUS LLP

(57) ABSTRACT

A two-way openable console includes side lid portions located on left and right sides of the console, a center lid portion located between the side lid portions to be open about one end portion in a longitudinal direction, a button unit located on each of front and rear end portions of the center lid portion, a rotation unit rotated about a center shaft in response to an input of the button unit, hinge units located on first and second end portions of the center lid portion and configured so that the rotation unit is rotated in response to an input of the button unit and thereby center shafts protruding to the side lid portions are selectively retracted into the center lid portion, and a catch unit located adjacent to each of the hinge units and integrally retracted in response to driving of each of the center shafts.

16 Claims, 10 Drawing Sheets

(56) References Cited

U.S. PATENT DOCUMENTS

| | | | | |
|---|---|---|---|---|
| 2023/0304339 | A1* | 9/2023 | Kim | B60R 7/04 |
| 2024/0344378 | A1* | 10/2024 | Woo | E05D 15/502 |

* cited by examiner

TWO-WAY OPENABLE CONSOLE

CROSS REFERENCE TO RELATED APPLICATION

The present application claims priority to Korean Patent Application No. 10-2023-0082578, filed Jun. 27, 2023, the entire contents of which is incorporated herein for all purposes by this reference.

BACKGROUND OF THE PRESENT DISCLOSURE

Field of the Present Disclosure

The present disclosure relates to a two-way openable console. More particularly, the present disclosure relates to a console which is openable about one set end among both ends of a center lid portion.

Description of Related Art

Generally, a console box is provided between a driver's seat of a vehicle and a front passenger's seat to temporarily store articles. An armrest is provided on the upper portion of the console box to serve as a lid and allow a passenger of the vehicle sitting on the seat to comfortably put his or her arms thereon.

The armrest is provided to support a driver's arm when shifting gears while driving a long distance, thus alleviating the fatigue of the driver.

The armrest includes a simple armrest that has a console therein and covers only a portion of a shift lever or a parking brake lever provided in a tunnel part of a floor panel between the driver's seat and the front passenger's seat, and a large armrest that forms a portion of an instrument panel to place a switch, a radio, a stereo, a heater control, a small storage pocket, and the like, has a box part with a padded lid on a back, and an ashtray or switch for a back seat.

Recently, to use consoles for various purposes, an open-type armrest is provided. Thus, research is being conducted to utilize a console space in the opened armrest as a loading space.

However, in the case of the console that opens in one direction so that a passenger located on a front or rear seat accesses the console space, only accessibility from one side is emphasized, thus causing inconvenience to a passenger located on the other side.

Therefore, a console structure which is selectively opened forwards or backwards is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a console structure including a center lid portion which may be opened forwards and backwards thereof.

Another objective of the present disclosure is to provide a console that strengthens a hinge structure of a center lid portion which is opened when the other end portion thereof is rotated and opened about one end portion of the center lid portion.

The objectives of the present disclosure are not limited to the above-mentioned objectives, and other objectives of the present disclosure that are not mentioned may be understood by the following description and will be more clearly understood by embodiments of the present disclosure. Furthermore, it will be easily understood that the objectives of the present disclosure may be realized by the means indicated in the claims and combinations thereof.

To accomplish the above-described objectives of the present disclosure, a two-way openable console includes the following components.

The present disclosure provides a two-way openable console including side lid portions located on left and right sides of the console, a center lid portion located between the side lid portions to be open about one of front and rear end portions in a longitudinal direction, a button unit located on each of front and rear end portions of the center lid portion, a rotation unit engaged to the button unit and rotated in response to an input of the button unit, hinge units located on first and second end portions of the center lid portion, and configured so that the rotation unit is rotated in response to an input of the button unit and thereby center shafts protruding to the side lid portions are selectively retracted into the center lid portion, and a catch unit located adjacent to each of the hinge units and integrally retracted in response to driving of each of the center shafts.

Furthermore, the hinge unit may include a hinge housing configured so that the center shaft is integrally moved in a direction facing the side lid portion, and a catch hole formed so that the catch unit is inserted into a side of the hinge housing, and the catch unit may be configured to be moved integrally with the hinge housing when the hinge housing is moved in the width direction of the center lid portion in response to driving of the button unit.

Furthermore, the catch unit may include a rod inserted into the hinge housing, and a catch step protruding to an outside of the center lid portion. When the catch step contacts with the side lid portion to be inserted into the center lid portion, the hinge housing fastened to the rod is integrally moved.

The console may further include an inlet portion located inside the side lid portion and configured to be inserted into the side lid portion at a location corresponding to the catch step.

Furthermore, the catch step may contact with the side lid portion and may be rotated and inserted into the center lid portion.

The console may further include a stopper unit located inside the center lid portion and protruding to the outside of the center lid portion adjacent to the catch step.

Furthermore, the stopper unit may contact with the side lid portion to be inserted into the center lid portion, and may be configured to restrict a movement of the rod.

The console may further include an opening striker located on the side lid portion and configured to pop up an upper surface of the inside of the center lid portion.

The console may further include a locking unit located on the center lid portion and fastened to the button unit to be unlocked from the side lid portion in response to the input of the button unit.

The locking unit may further include a locking rod fastened to each of the button units located on the first and second end portions of the center lid portion, and a locking portion fastened to the locking rod to be selectively inserted into the side lid portion.

Furthermore, in response that the input is applied to the button unit, an internal end portion of the locking rod fastened to each of the button units may be moved to an adjacent location.

The present disclosure provides a two-way openable console including side lid portions located on left and right sides of the console, a center lid portion located between the side lid portions to be open about one of front and rear end portions in a longitudinal direction, a button unit located on each of front and rear end portions of the center lid portion, center shafts located on first and second end portions of the center lid portion to be inserted into the side lid portions, hinge units configured so that the center shafts are selectively retracted into the center lid portion in response to an input of the button unit, and a catch unit located adjacent to each of the hinge units and integrally retracted into the center lid portion in response to a movement of each of the center shafts.

The console may further include a rotation unit located between the button unit and the hinge unit in response to the input of the button unit.

Furthermore, the rotation unit may be configured to transfer the input of the button unit in a longitudinal direction of the center lid portion to the hinge units located on both sides of the center lid portion.

Furthermore, the hinge unit may include a hinge housing configured so that the center shaft is integrally moved in a direction facing the side lid portion, and a catch hole formed so that the catch unit is inserted into a side of the hinge housing, and the catch unit may be configured to be moved integrally with the hinge housing when the hinge housing is moved in the width direction of the center lid portion in response to driving of the button unit.

Furthermore, the catch unit may include a rod inserted into the hinge housing, and a catch step protruding to an outside of the center lid portion. When the catch step contacts with the side lid portion to be inserted into the center lid portion, the hinge housing fastened to the rod is integrally moved.

The console may further include an inlet portion located inside the side lid portion and configured to be inserted into the side lid portion at a location corresponding to the catch step.

The console may further include a locking unit located on the center lid portion and fastened to the button unit to be unlocked from the side lid portion in response to the input of the button unit.

The locking unit may further include a locking rod fastened to each of the button units located on the first and second end portions of the center lid portion, and a locking portion fastened to the locking rod to be selectively fastened to the side lid portion. In response that the input is applied to the button unit, an internal end portion of the locking rod fastened to each of the button units is moved to an adjacent location.

When the input is applied to the button unit, the locking rod may be moved in the longitudinal direction of the center lid portion, and the catch step located on the locking portion may be moved in the width direction of the center lid portion, so that the locking portion fastened to the side lid portion may be inserted into the center lid portion.

The present disclosure can obtain the following effects by combining and using the above-described embodiment and the following configuration.

The present disclosure is advantageous in that a center lid portion may be selectively opened forwards and backwards thereof, thus providing a console accessible by passengers located in front and rear seats.

Moreover, the present disclosure is advantageous in that it is possible to provide the function of preventing the removal of a hinge unit when a center lid portion is opened about one end portion, thus allowing a console to be stably opened.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
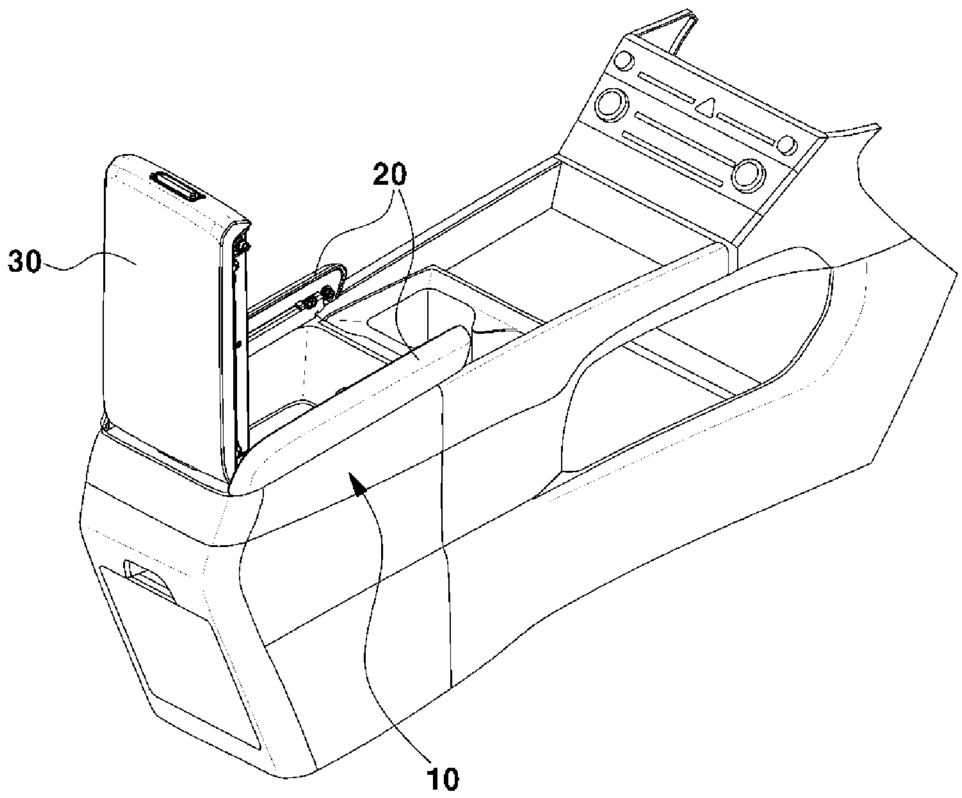
FIG. 1A illustrates a console which is opened about a rear end portion of a center lid portion, according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, various exemplary embodiments of the present disclosure will be described in detail with reference to the accompanying drawings. The present disclosure may be embodied in various forms and should not be construed as being limited to only the exemplary embodiments set forth herein. These embodiments are provided to make those skilled in the art more thoroughly and completely understand the present disclosure.

Furthermore, terms such as “part”, “unit,” and “lid part” described in the specification mean a unit that processes at least one function or operation, which may be implemented by hardware, software, or a combination of hardware and software.

The terminology used herein is for describing various exemplary embodiments only and is not intended to be limiting. In an exemplary embodiment of the present disclosure, the singular forms are intended to include the plural forms as well, unless the context clearly indicates otherwise.

Furthermore, the classification of components in the present specification as “one end” or “the other end” is intended for distinguishing them based on the similarity of their names. It is to be noted that the explanations provided below are not limited strictly to their order.

Herein, the components of a movable “unit” or “part” are components that are restored after movement, and may include an elastic member or a separate driving portion. Hereinafter, the expression “restore” may be interpreted as covering all driving relationships.

Herein, the term “longitudinal direction” may mean the front and back direction of a vehicle or console, and the term “width direction” may mean the lateral direction of the vehicle or console. However, because the longitudinal direction and the width direction simply mean directions that are perpendicular to each other, both end portions of a center lid portion may be selectively opened about one end portion in the longitudinal or lateral direction thereof.

Moreover, the longitudinal direction means a direction in which movement is made with respect to the center lid portion, while the width direction means a direction which is perpendicular to the longitudinal direction on a plane with respect to the center lid portion.

Although a configuration in which the other end portion of the center lid portion selected from both directions is opened about one end portion in the longitudinal direction has been described hereinafter, a configuration in which opening is made with respect to one end portion of the center lid portion in the width direction thereof may be included.

The present disclosure is directed to a two-way openable console 10, and is configured so that a center lid portion 30 is opened in both directions about side lid portions 20 located on both sides of an upper portion of a housing of the console 10. Moreover, the present disclosure is directed to the two-way openable console 10 configured so that the center lid portion 30 is rotatably opened about a front or rear end portion of the center lid portion 30.

Figure 1B:
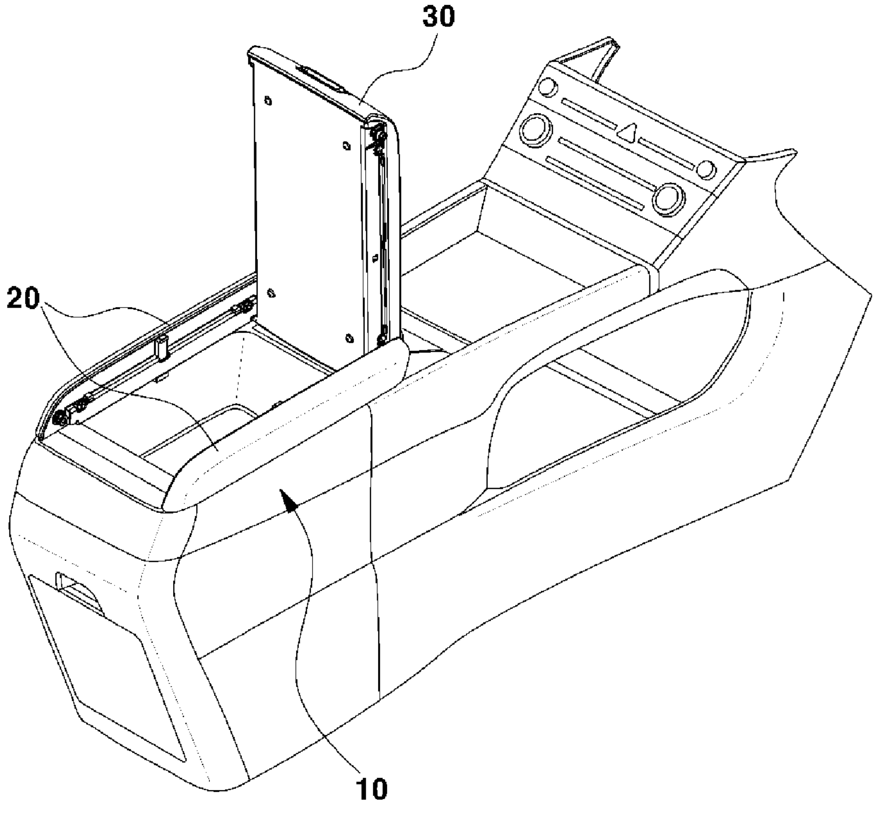
FIG. 1B illustrates the console which is opened about a front end portion of the center lid portion, according to an exemplary embodiment of the present disclosure.

FIG. 1A illustrates a state in which the center lid portion 30 is opened about the rear end portion of the center lid portion 30 in the longitudinal direction thereof, according to an exemplary embodiment of the present disclosure, and FIG. 1B illustrates a state in which the center lid portion 30 is opened about the front end portion of the center lid portion 30 in the longitudinal direction thereof.

The console 10 of the present disclosure may be located inside the vehicle, and includes at least one partitioned storage space therein. Moreover, the console 10 of the present disclosure is configured to rotatably open the center lid portion 30 which is located on the upper surface. The center lid portion 30 is configured so that the other end portion thereof is rotated upwards to be opened in a state where the center lid portion is hinged to the side lid portions 20 located on both sides of the upper end portion of the storage space of the console 10.

The console according to an exemplary embodiment of the present disclosure includes button units 100 that are located at both end portions of the center lid portion 30 in a longitudinal direction thereof, a rotation unit 200 that transmits the longitudinal input of the button unit 100 as the transverse tension of a hinge unit 300, and the hinge unit 300 which is located inside the center lid portion 30 so that a center shaft 330 is selectively disengaged from the side lid portion 20.

The hinge unit 300 includes the center shaft 330 which is inserted into a shaft hole 23 located in the side lid portion 20, and a hinge housing 310 which is moved in the width direction of the center lid portion 30 integrally with the center shaft 330.

When an opening input is applied to the button unit 100 located at one end portion of the center lid portion 30 in the longitudinal direction thereof, the button unit 100 causes the hinge unit 300 to move through the rotation unit 200 into the center lid portion 30. Thus, the hinge housing 310 and the center shaft 330 are integrally moved into the center lid portion 30. At the instant time, the center shaft 330 is disengaged from the shaft hole 23 located in the side lid portion 20, so that one end portion of the center lid portion 30 to which the button input is applied is freely movable upwards and downwards.

In comparison, in the case of the other end portion to which no button input is applied, the center shaft 330 is engaged to the shaft hole 23 of the side lid portion 20. Accordingly, one end portion of the center lid portion 30 may be rotatably opened in a height direction about the center shaft 330 on the other end portion of the center lid portion 30.

At least one catch units 400 may be located on both sides of the center lid portion 30 facing the side lid portion 20. According to an exemplary embodiment of the present disclosure, the catch units are located on both sides of the center lid portion 30 to be adjacent to the hinge units 300. The catch unit 400 includes a catch step 420 which is configured so that a portion thereof protrudes in a direction facing the side lid portion 20. The catch unit includes a rod 410 which is secured to the inside of the center lid portion 30, and the rod 410 is engaged to the catch hole 320 of the hinge housing 310.

Moreover, the catch step 420 and the rod 410 is configured to be rotatable along the rotating central axis of the center lid portion 30. Thus, when the opening input is applied to the button unit 100 located in one open end portion of the center lid portion 30, the rod 410 is moved integrally with the hinge housing 310 and the catch step 420 is rotated upwards relative to the center lid portion 30. Thus, the rod 410 located inside the center lid portion 30 is configured to rotate downwards relative to the center lid portion 30. The central axis about which the catch unit 400 rotates is located between the rod 410 and the catch step 420.

When the catch unit 400 rotates, the rod 410 moves to include a rotational trajectory inside the center lid portion 30. Thus, the hinge housing 310 includes the catch hole 320 which is formed in the height direction of the center lid portion 30 in response to the motion of the rod 410. Therefore, the hinge housing 310 is moved in the width direction of the center lid portion 300 in response to the rotational trajectory of the rod 410, and includes the shape of the catch hole 320 in the height direction thereof.

The catch step 420 may be configured so that a section protruding in the height direction becomes smaller, and furthermore, may include a smaller section toward a lower end portion in the height direction thereof. That is, the catch step 420 is configured so that sections of upper and lower end portions of the center lid portion 30 contacting with the side lid portion 20 become smaller, thus allowing the center lid portion 30 to be easily separated from or accommodated on the side lid portion 20.

Accordingly, when opening input is applied to the button unit 100 located at one of the front and rear end portions of the center lid portion 30, the hinge housing 310 of one end portion to which the opening input is applied moves away from the side lid portion 20 integrally with the rod 410 of the catch unit 400, and the center shaft 330 is inserted into the center lid portion 30 to release the side lid portion 20 from the center lid portion 30. Thus, one end portion of the center lid portion 30 including the button unit 100 to which the opening input is applied is rotated and opened with respect to the center shaft 330 located at the other end portion.

Figure 2:
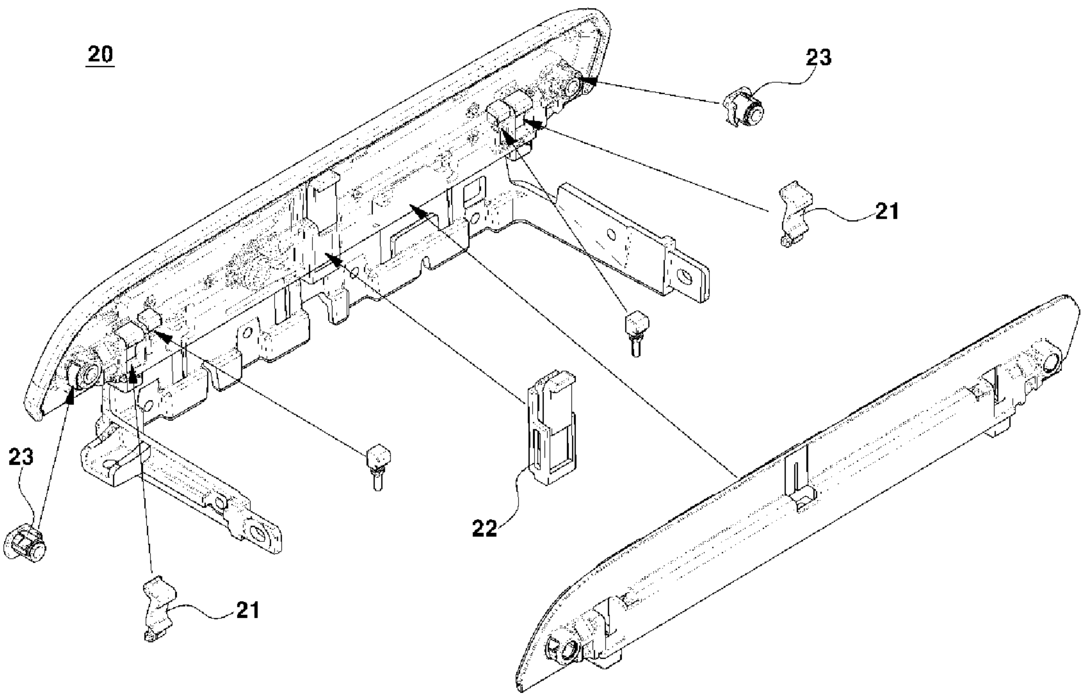
FIG. 2 illustrates the configuration of a side lid portion, according to an exemplary embodiment of the present disclosure.

FIG. 2 illustrates the configuration of the side lid portion 20, according to an exemplary embodiment of the present disclosure.

The side lid portions 20 are located on both sides of the open upper end portion of the housing of the console 10. Moreover, the side lid portion 20 includes, on front and rear end portions thereof, shaft holes 23 into which the hinge units 300 provided on the center lid portion 30 are inserted. Moreover, the side lid portion includes inlet portions 21 at areas facing the catch steps 420 that protrude from both sides of the center lid portion 30. The inlet portion 21 includes a shape corresponding to the catch step 420, and is configured to be retracted into the side lid portion 20 with respect to the lower end portion. Thus, when the catch step 420 is separated from the side lid portion 20, the catch step 420 may be inserted into the side lid portion 20 to prevent interference. Furthermore, the inlet portion 21 may be configured to be rotated toward the inside of the side lid portion 20, so an elastic member may be further provided on the rotation shaft to restore the inlet portion 21 to an original position thereof.

Therefore, as the catch step 420 is retracted into or separated from the side lid portion 20, the inlet portion 21 may be rotatably moved into the side lid portion 20 with respect to the lower end portion of the side lid portion 20 to prevent interference with the side lid portion 20.

Furthermore, the shaft holes 23 are located at the front and rear end portions of the side lid portion 20 to be engaged to the center shafts 330 of the hinge unit 300, respectively. Moreover, the side lid portion 20 includes an opening striker 22 configured to move up and deploy to the top portion of the side lid portion. The opening striker 22 is configured to face the rear surface of the center lid portion 30. When the hinge unit 300 is first unfastened, a predetermined tension is applied to the rear surface of the center lid portion 30 so that the center lid portion 30 moves up to the top.

The opening striker 22 is configured so that an elastic force is applied in a direction for pushing the rear surface of the center lid portion 30 by the elastic member located on the inside of the side lid portion 20 and an unlocked end portion includes a predetermined angle with the side lid portion 20. According to an exemplary embodiment of the present disclosure, the other end portion of the center lid portion 30 is configured to move upward by about 7 degrees with respect to one end portion at which the center shaft 330 is restrained.

FIG. 3A, FIG. 3B, FIG. 3C, and FIG. 3D illustrate the coupling relationship of the button unit 100, the hinge unit 300, and the catch unit 400, according to an exemplary embodiment of the present disclosure.

The button units 100 are located at both end portions inside the center lid portion 30 in the longitudinal direction thereof. When the opening input is applied to the button unit 100, tension is applied to a locking unit 600 located inside the center lid portion 30.

The locking unit 600 includes a locking rod 610 located to be in contact with the button unit 100, and a locking portion 620 located so that at least a portion thereof protrudes to an area facing the side lid portion 20. Because the locking portion 620 protrudes to an area interfering with the side lid portion 20, the locking portion 620 always applies the elastic force to the outside of the center lid portion 30 through the elastic member located in the locking portion 620. However, the locking portion 620 protruding to the area interfering with the side lid portion 20 comes into contact with the side lid portion 20 to be retracted into the center lid portion 30 in a state where the center lid portion 30 is closed, and protrudes to the outside of the center lid portion 30 in a state where the center lid portion 30 is open. Furthermore, the locking unit 600 may further include a bracket 630. The locking portion 620 is positioned on the bracket 630, and the bracket 630 is fastened to the locking rod 610.

The area where the locking portion 620 interferes with the side lid portion 20 is configured to be inclined along the side lid portion 20. Thus, when the locking portion contacts with the side lid portion 20, the locking portion 620 moves in the width direction along the inside of the center lid portion 30.

Two locking rods 610 located on both sides of the center lid portion 30 may be located to be adjacent to each other in an area where the locking portion 620 is located. Moreover, the locking portion 620 includes an interference portion 640 to be selectively inserted between the two locking rods 610. When the center lid portion 30 is closed, the interference portion 640 retracts in the width direction of the center lid portion 30 integrally with the locking portion 620 and then is located so as not to interfere with the longitudinal movement of the two locking rods 610. When the center lid portion 30 is open, the interference portion moves outwards in the width direction of the center lid portion 30 integrally with the locking portion 620 to be inserted between the two locking rods 610 in the longitudinal direction thereof. Therefore, the interference portion 640 is configured to restrict the input of the button unit 100 provided on the other end portion of the center lid portion 30 when one end portion of the center lid portion 30 is open.

Moreover, a gap formed between the two locking rods 610 adjacent to the locking portion 620 is substantially the same as a distance corresponding to a movement amount by which one button unit 100 moves in the longitudinal direction to separate the center shaft 330 from the side lid portion 20. Thus, even when the button units 100 located on both end portions are simultaneously input, the two locking rods 610 come into contact with each other, thus preventing the center shafts 330 located on both end portions of the center lid portion 30 from being separated from the side lid portion 20.

That is, in response to the input of one button unit 100, the locking rod 610 moves in the longitudinal direction of the center lid portion 30. Moreover, when the center lid portion 30 is closed, the two locking rods 610 are spaced from each other with a predetermined distance. In response to the input of the button unit 100 in the longitudinal direction, it is configured to be in contact with an end portion of another adjacent locking rod 610. After the button unit 100 is input, the button unit 100 is restored to an original position of thereof integrally with the locking rod 610, and the two locking rods 610 are moved to be spaced from each other with a predetermined distance.

Thereafter, when the center lid portion 30 is open, the locking portion 620 and the interference portion 640 move to the outside of the center lid portion 30 in the width direction, and the interference portion 640 is inserted into the gap between two adjacent locking rods 610 to restrict the input of the button units 100 on both end portions.

Figure 3A:
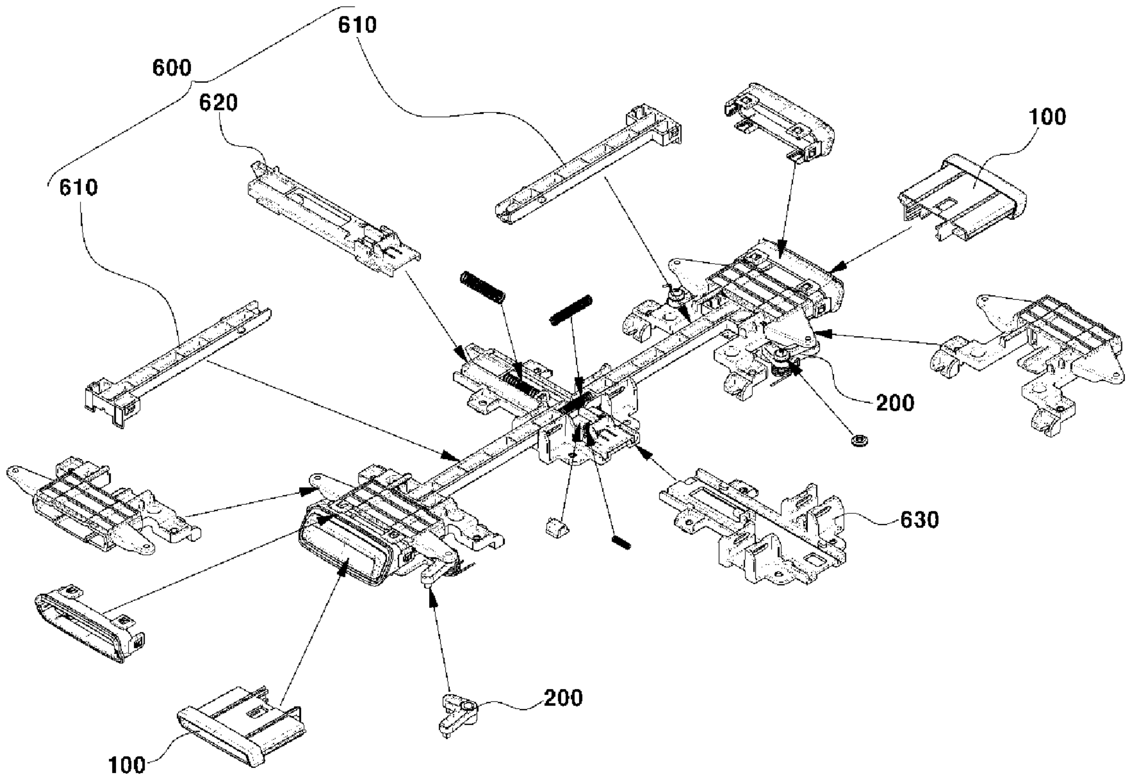
FIG. 3A illustrates a coupling structure of units located in the center lid portion, according to an exemplary embodiment of the present disclosure.
Figure 3B:
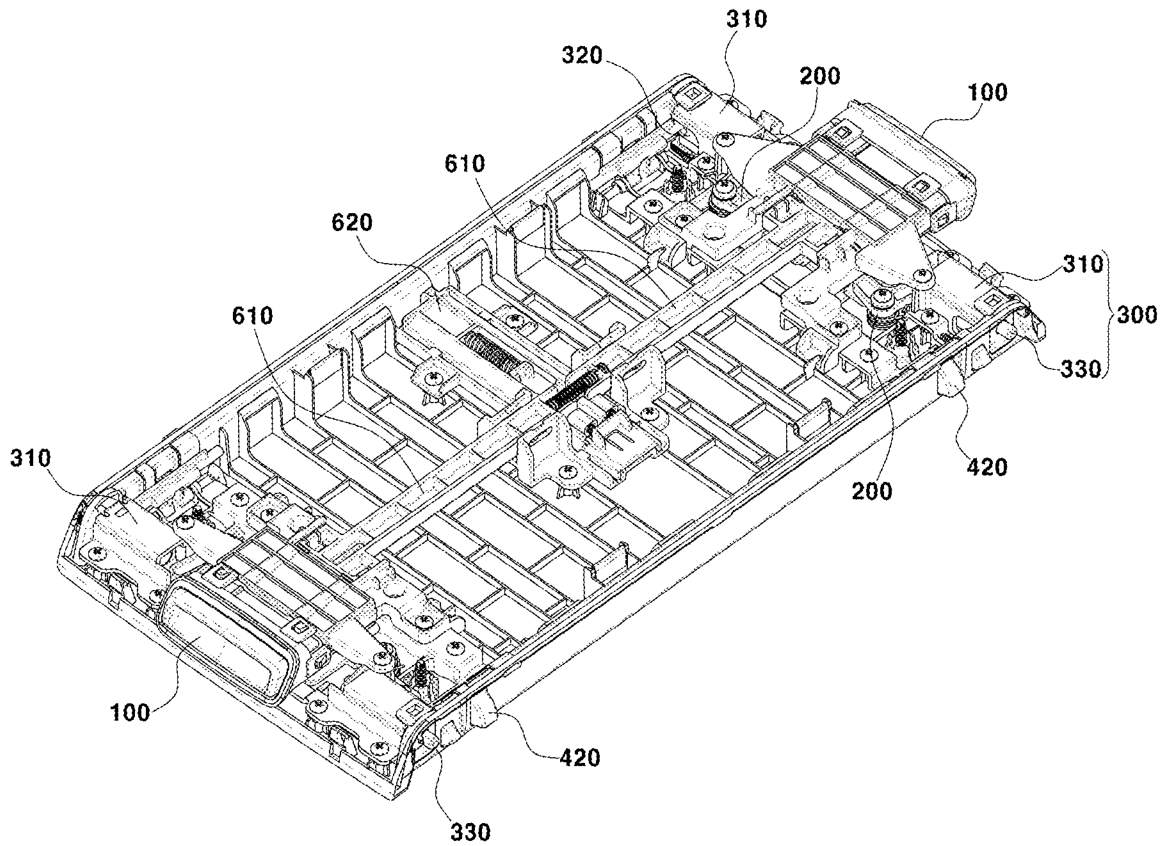
FIG. 3B illustrates the coupling of components located on a rear surface of the center lid portion, according to an exemplary embodiment of the present disclosure.
Figure 3C:
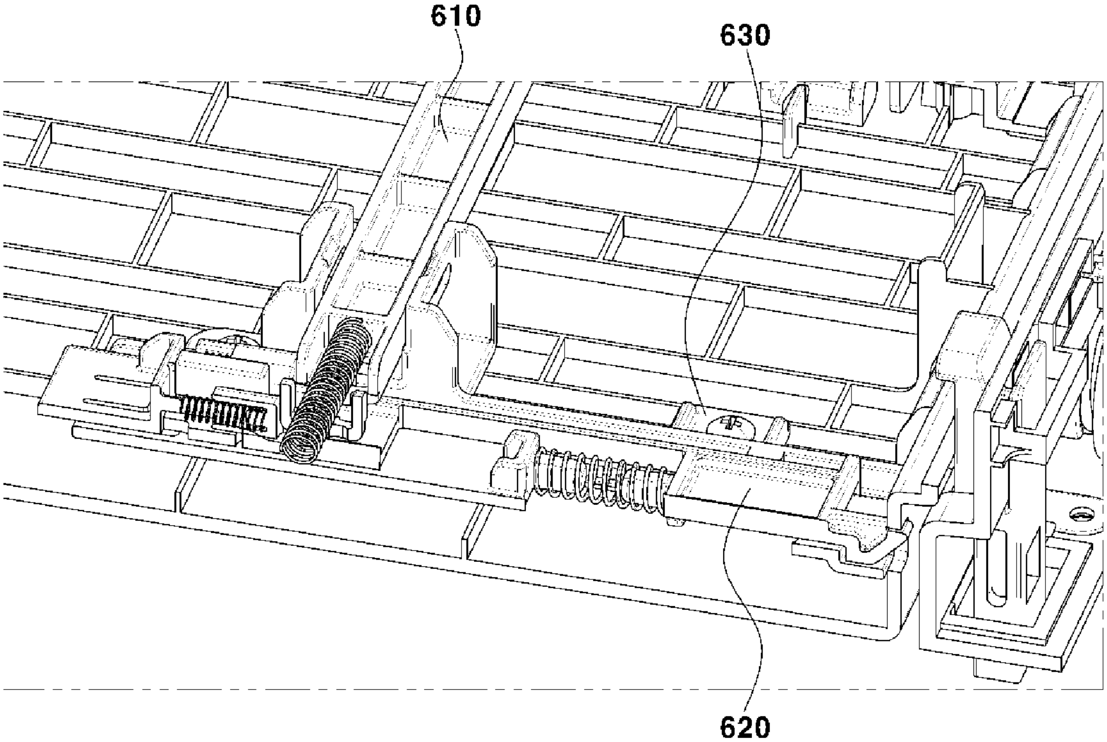
FIG. 3C illustrates the coupling of a button unit located on the rear surface of the center lid portion, according to an exemplary embodiment of the present disclosure.
Figure 3D:
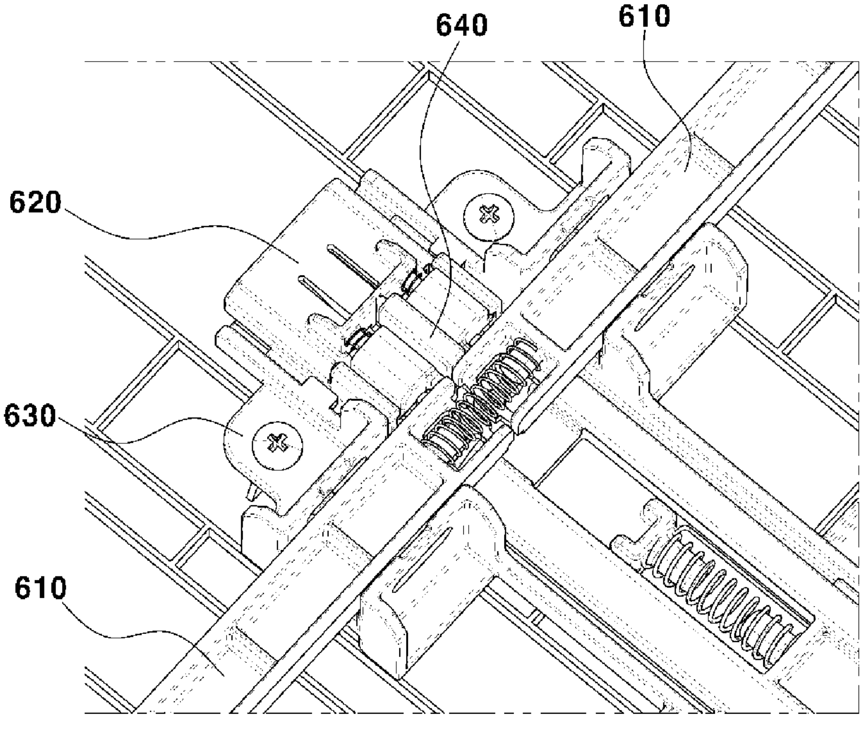
FIG. 3D illustrates the driving relationship of a locking unit located on the rear surface of the center lid portion in a state where the input of the button unit is applied, according to an exemplary embodiment of the present disclosure.

FIG. 3D illustrates the configuration of the locking rod 610 in a state where the button input is applied to one end portion of the center lid portion 30.

As shown in the drawing, the locking rod 610 fastened to the button unit 100 at one end portion to which input is applied is moved in the longitudinal direction of the center lid portion 30, and is configured to face an end portion of the locking rod 610 fastened to the button unit 300 located at the other end portion on the locking portion 620. That is, when the opening input of the button unit 100 located at one end portion of the center lid portion 30 is applied, the locking rod 610 to which an opening request is input and the locking rod 610 fastened to the button unit 100 at the other end portion are configured to come adjacent to each other about the locking portion 620.

Subsequently, the center lid portion 30 is configured so that one end portion of the input button unit 100 is open and the button unit 100 and the locking rod 610 restore to their original positions. Therefore, when the center lid portion 30 is open, the two locking rods 610 are spaced from each other with a predetermined distance.

Figure 3E:
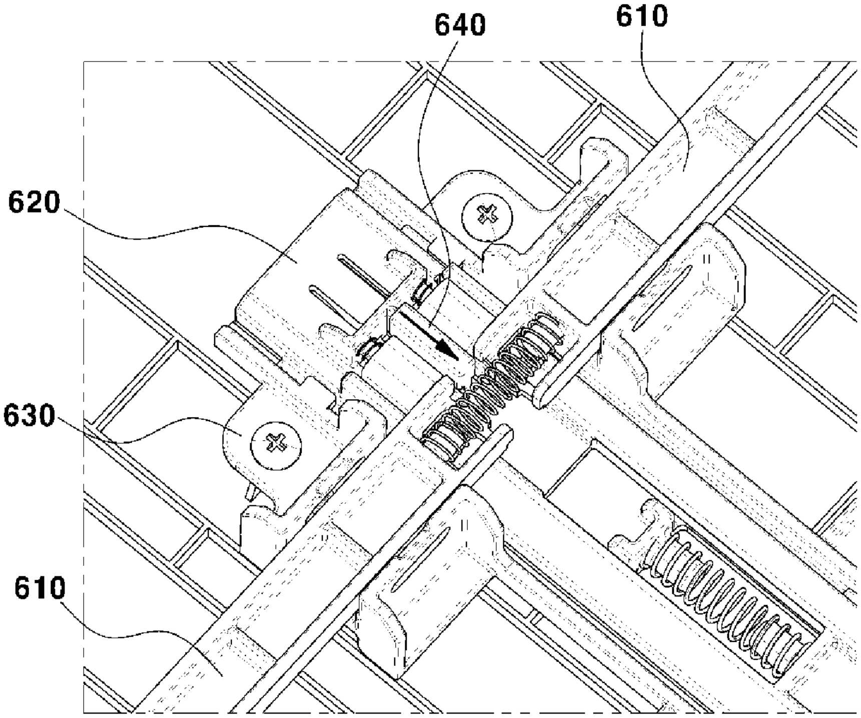
FIG. 3E illustrates the driving relationship of the locking unit in a state where the center lid portion is opened, according to an exemplary embodiment of the present disclosure.

Moreover, as shown in FIG. 3E, when one end portion of the center lid portion 30 including the button unit 100 to which the input is applied is rotated to be open, the locking portion 620 moves in the width direction to a position adjacent to the side lid portion 20, and the interference portion 640 is inserted into the gap between the two locking rods 610. Therefore, when the center lid portion 30 is open, the longitudinal movement of the locking rod 610 is limited, and accordingly, the input of the button units 100 located at both end portions are restricted.

Thereafter, when the open center lid portion 30 is closed, one protruding end portion of the locking portion 620 is inserted into the center lid portion 30 by the side lid portion 20, and the interference portion 640 is separated from the gap between the two locking rods 610. Thus, it is switched to a state in which the additional input of the button unit 100 is possible.

Figure 4:
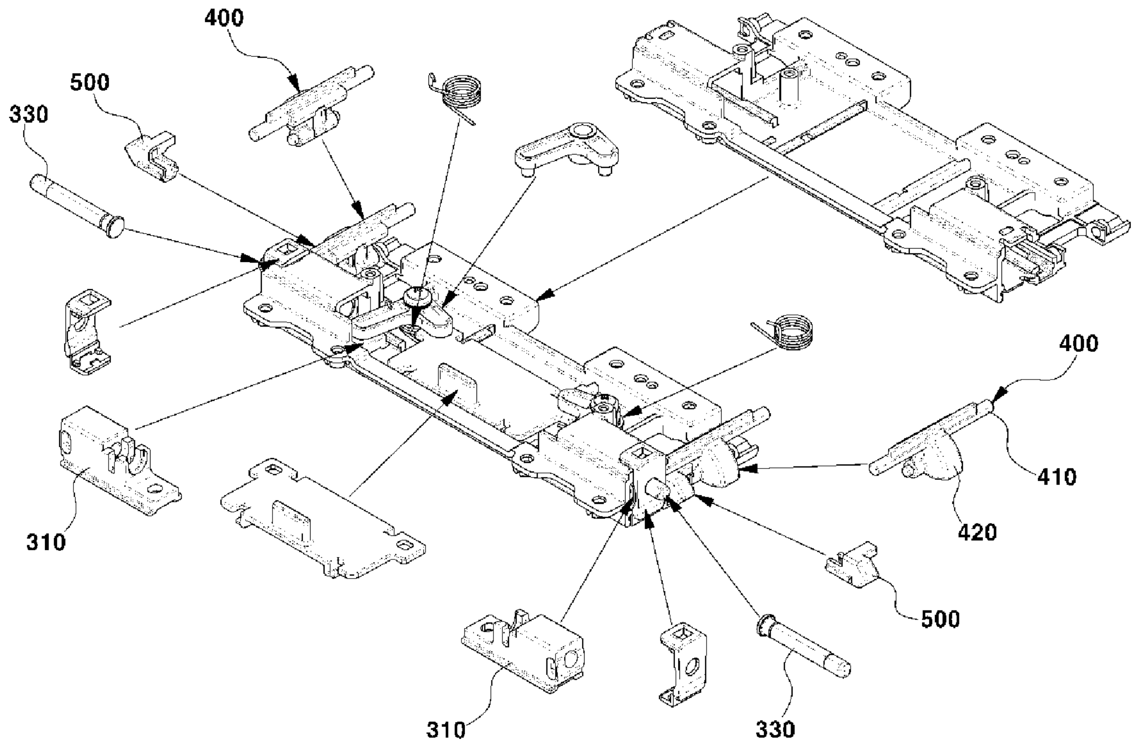
FIG. 4 illustrates the coupling relationship of the button unit, a hinge unit, and a catch unit, according to an exemplary embodiment of the present disclosure.

FIG. 4 illustrates the coupling relationship of the hinge unit 300 and the catch unit 400 located inside the center lid portion 30, according to an exemplary embodiment of the present disclosure.

As shown in the drawing, the rotation unit 200 contacting with the button unit 100 is configured to rotate along the center shaft fastened to the center lid portion 30 in response to the longitudinal movement of the button unit 100. Moreover, the hinge unit 300 fastened to the end portion of the rotation unit 200 is configured to move in a direction adjacent to the inside of the center lid portion 30. When the hinge housing 310 is fastened to the rotation unit 200 and the rotation unit 200 is rotated by the button unit 100, the center shaft 330 is configured to move integrally with the hinge housing 310 in a direction away from the side lid portion 20.

The catch unit 400 is located to be adjacent to the hinge unit 300. Moreover, the catch unit 400 includes the rod 410 which is configured so that at least a portion thereof is inserted into the catch hole 320 of the hinge housing 310, and the catch step 420 which is configured to protrude to the outside of the center lid portion 30. Therefore, when the hinge housing 310 moves in the width direction about the center lid portion 30, the rod 410 and the center shaft 330 located inside the hinge housing 310 move integrally in the moving direction of the hinge housing 310.

The catch unit 400 is fastened to the center lid portion 30 so that the rotating center shaft is formed between the catch step 420 and the rod 410, and the rod 410 moves to the inside of the center lid portion 30 in response to the movement of the hinge housing 310. Moreover, the catch step 420 is rotated in a direction away from the side lid portion 20 and then retracted into the center lid portion 30. When the rod 410 moves integrally with the hinge housing 310, the rod 410 rotates along the rotating central axis, so that the catch hole 320 of the hinge housing 310 is located in the height direction thereof.

Accordingly, when the opening input is applied to the button unit 100 located at one end portion of the center lid portion 30, the widthwise tension is transmitted to the hinge unit 300 through the rotation unit 300 fastened to the button unit 100, and the hinge housing 310 moves into the center lid portion 30 in response to the applied tension. Moreover, the center shaft 330 located inside the hinge housing 310 and the rod 410 located inside the catch hole 320 of the hinge housing 310 are integrally moved into the center lid portion 30, so one end portion of the center lid portion 30 to which the opening input is applied is unfastened from the side lid portion 20.

Figure 5A:
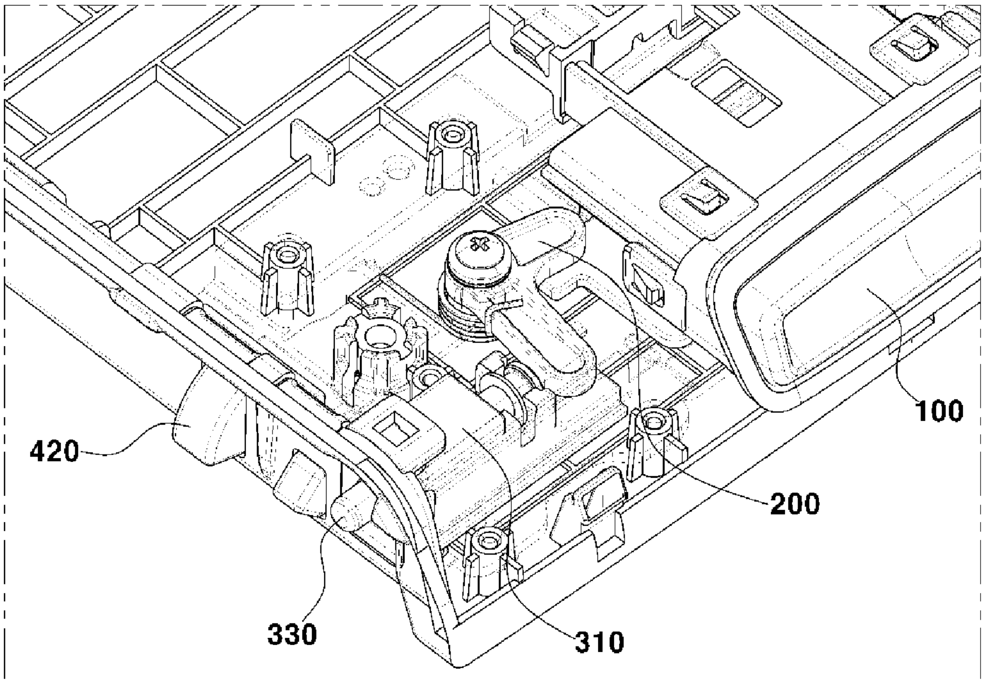
FIG. 5A illustrates the driving relationship of the hinge unit and the catch unit, according to an exemplary embodiment of the present disclosure.

In detail, FIG. 5A illustrates the driving relationship of the hinge unit 300 in response to the opening input of the button unit 100.

As shown in the drawing, the button unit 100 located at one end portion of the center lid portion 30 moves into the center lid portion 30 in the longitudinal direction thereof in response to a user's opening input. The rotation unit 200 which is fastened to the button unit 100 and is rotated about the plane of the center lid portion 30 is configured to lead to the widthwise movement of the hinge unit 300 in response to the longitudinal movement of the button unit 100. The rotation unit 200 includes two lids. One lid is fastened to the button unit 100, while the other lid is fastened to the hinge housing 310. Thus, one lid fastened to the button unit 100 is rotated counterclockwise in response to the longitudinal movement of the button unit 100, and the hinge housing 310 fastened to the other lid moves into the center lid portion 30.

The center shaft 330, which is moved integrally with the hinge housing 310, protrudes to the outside of the center lid portion 30 in the initial locked state to be rotatably located in the shaft hole 23 located in the side lid portion 20, and the hinge housing 310 is moved to be inserted into the center lid portion 30 in response to the opening input of the button unit 100.

Figure 5B:
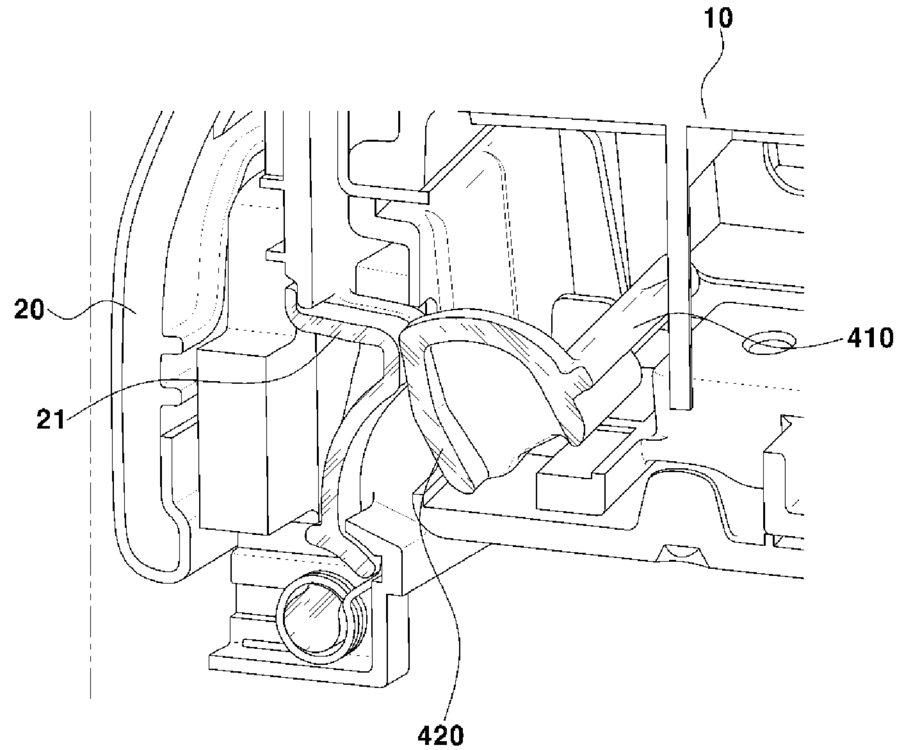
FIG. 5B illustrate the driving relationship of the catch unit and an inlet portion, according to an exemplary embodiment of the present disclosure.

FIG. 5B illustrates the driving relationship of the catch unit 400 between the side lid portion 20 and the center lid portion 30.

The catch unit 400 configured so that the rod 410 is located in the catch hole 320 of the hinge housing 310 and the catch step 420 protrudes to the outside of the center lid portion 30 is configured to move into the center lid portion 30 integrally with the catch unit 400, when the hinge housing 310 moves away from the side lid portion 20. When the rod 410 moves integrally with the hinge housing 310, the catch step 420 is rotated about the center lid portion 30, so that the catch unit 400 rotatably located in the center lid portion 30 is retracted into the center lid portion 30.

Furthermore, the catch hole 320 located in the hinge housing 310 is formed in the height direction to correspond to the rotation direction of the rod 410, so that the catch unit 400 may be rotated about the center lid portion 30. When the catch step 420 is rotated to be inserted into the center lid portion 30, it may be spaced from the inlet portion 21, thus allowing the center lid portion 30 to be separated upwards without the interference of the side lid portion 20.

Furthermore, the inlet portion 21 located in the side lid portion 20 is configured to be rotated and inserted into the side lid portion 20 with respect to the lower end portion of the side lid portion 20.

Therefore, when the catch step 420 is inserted into the center lid portion 30 and the upper end portion of the inlet portion 21 comes into contact with the catch step 420, the inlet portion 21 may be inserted into the side lid portion 20, thus allowing the side lid portion 20 and the center lid portion 30 to be driven without interference when the top portion of the center lid portion 30 is opened.

The catch step 420 may be configured to be further rotated into the center lid portion 30, even when a predetermined interference occurs with the inlet portion 21 or the side lid portion 20. That is, the catch step may be further rotated and retracted into the center lid portion 30, when it contacts with the side lid portion 20 even after being inserted into the center lid portion 30 integrally with the hinge housing 310.

Figure 6A:
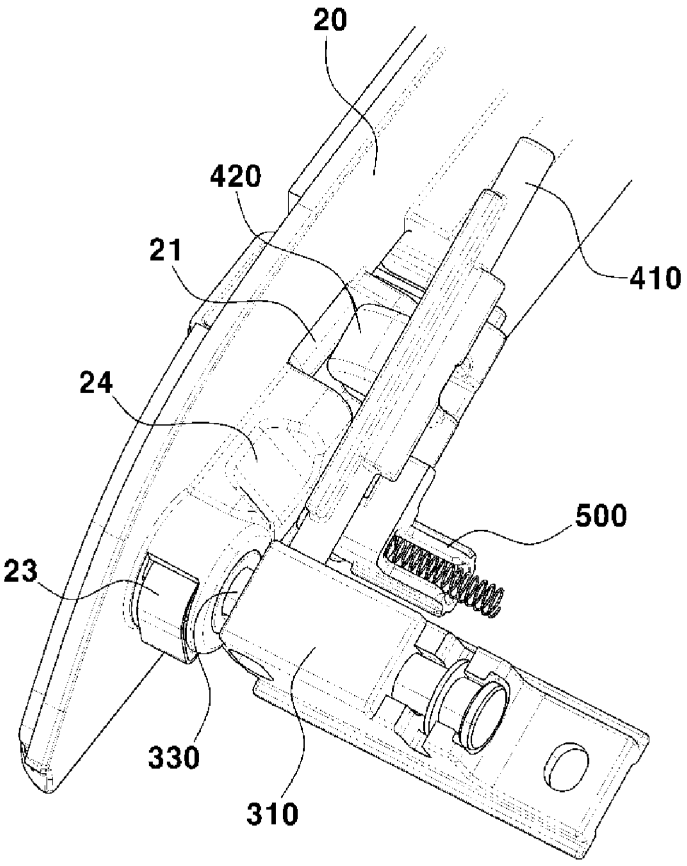
FIG. 6A illustrates the coupling relationship of the catch unit and a stopper unit, according to an exemplary embodiment of the present disclosure.
Figure 6B:
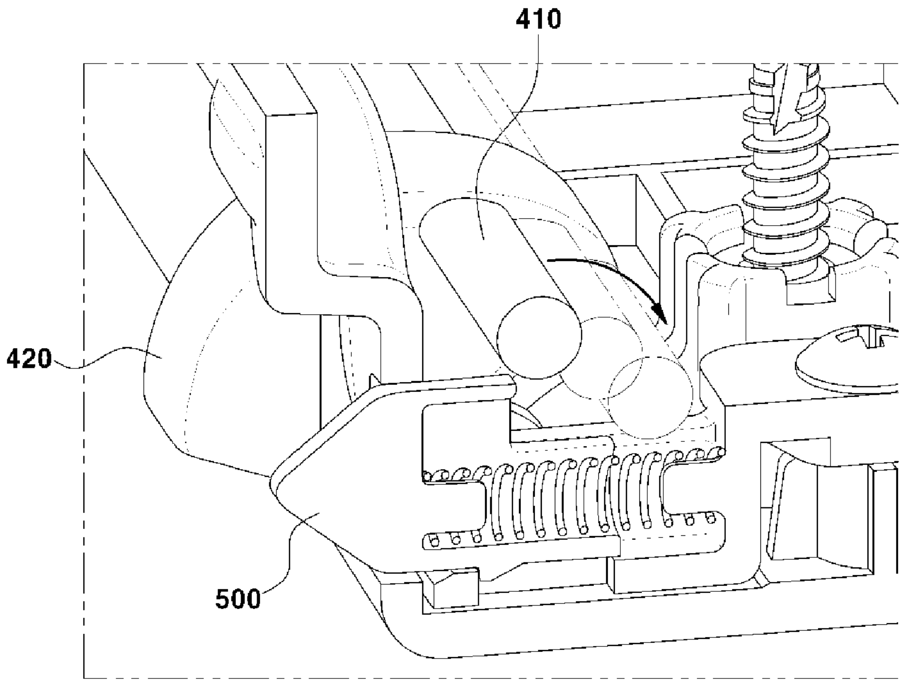
FIG. 6B illustrates the driving relationship of the catch unit and the stopper unit located in the center lid portion which may be disengaged from the side lid portion, according to an exemplary embodiment of the present disclosure.
Figure 6C:
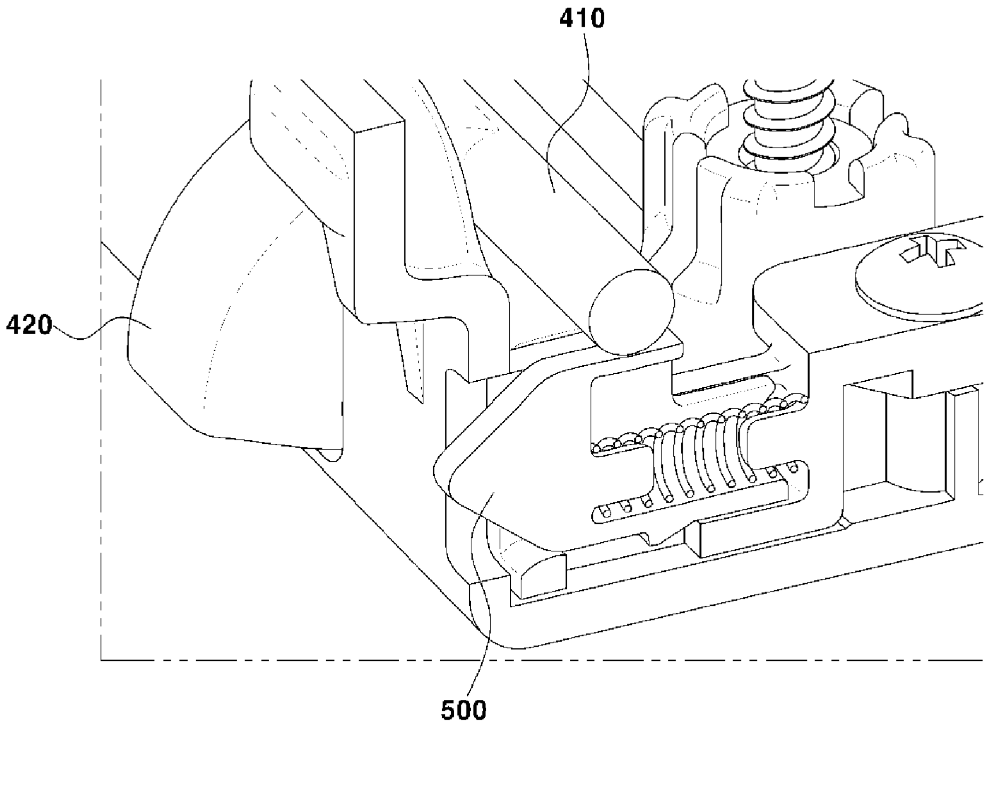
FIG. 6C illustrates the driving relationship of the catch unit and the stopper unit located in the center lid portion which may not be disengaged from the side lid portion, according to an exemplary embodiment of the present disclosure.

FIG. 6A illustrates the configuration of a stopper unit 500 located adjacent to the catch unit 400, and FIG. 6B illustrates a state in which the stopper unit 500 does not interfere with the catch unit 400. Furthermore, FIG. 6C illustrates the position relationship of the stopper unit 500 which is inserted into the center lid portion 30 to restrict the movement of the rod 410 of the catch unit 400.

The stopper unit 500 is located adjacent to the catch unit 400. According to an exemplary embodiment of the present disclosure, the stopper unit is located between the hinge housing 310 and the catch unit 400, and is configured to be adjacent to the rod 410 inserted into the catch hole 320 of the hinge housing 310. Because the stopper unit 500 protrudes to the outside of the center lid portion 30, at least a portion thereof may protrude between the catch step 420 and the center shaft 330.

The inside of the stopper unit 500 protruding to the outside of the center lid portion 30 includes an elastic member, so that the stopper unit may be selectively inserted into the center lid portion 30. In the open state, at least a portion of the stopper unit 500 is located to protrude to the outside of the center lid portion 30.

As shown in FIG. 6B, the stopper unit 500 is located to be adjacent to the catch unit 400, and at least a portion of the stopper unit 500 is set to protrude to the outside of the center lid portion 30. Therefore, the stopper unit 500 is located so that the catch unit 400 is freely rotatable.

When the center lid portion 30 is closed to the space between the side lid portions 20 from the open state, the separation of the center shaft 330 provided as the rotation shaft from the side lid portion 20 should be prevented until the center lid portion 30 is completely closed. Thus, the stopper unit 500 is configured to be in contact with the side lid portion 20 prior to the catch step 420, and the stopper unit 500 is inserted into the center lid portion 30. The stopper unit 500 inserted into the center lid portion 30 is configured to limit the rotation of the catch unit 400, thus restricting the movement of the hinge housing 310 in the width direction of the center lid portion 30.

That is, when the catch step 420 faces the inlet portion 21 in a state where the stopper unit 500 is inserted into the center lid portion 30, the catch unit 400 is configured so as not to rotate. Thus, the protruding area of the stopper unit 500 first contacts with a stopper shaft hole 24 located in the side lid portion 20, and the stopper unit 500 is inserted into the center lid portion 30. Subsequently, the catch step 420 is configured to face the inlet portion 21. In the instant case, the stopper unit 500 is configured to restrict the rotation of the rod 410.

Therefore, the catch step 420 is restricted so as not to be rotated to the inside of the center lid portion 30 in response to the movement of the stopper unit 500, and the inlet portion 21 is rotated and inserted into the side lid portion 20 so that the center lid portion 30 may be switched to a closed state.

In summary, when one end portion of the center lid portion 30 is open, the center shaft 330 located at the other end portion thereof is configured so that the stopper unit 500 is first inserted into the center lid portion 30 so as not to be disengaged by the adjacent catch unit 400. Therefore, the center shaft 330 of the center lid portion 30 which is not opened may remain inserted into the side lid portion 20 until the center lid portion 30 is switched to the closed state.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A two-way openable console comprising:

side lid portions located on first and second sides of the two-way openable console;

a center lid portion located between the side lid portions to be operatively open about a first end of the center lid portion;

a button unit located on each of front and rear end portions of the center lid portion;

a rotation unit engaged to the button unit and rotated in response to an input of the button unit;

hinge units located on first and second end portions of the center lid portion, and configured so that the rotation unit is rotated in response to the input of the button unit and thereby center shafts protruding from first and second sides of the center lid portion are selectively retracted into the center lid portion; and a catch unit located adjacent to each of the hinge units, and integrally retracted in response to driving of each of the center shafts, wherein each of the hinge units includes a hinge housing configured so that a corresponding center shaft among the center shafts is integrally moved in a width direction of the center lid portion, and a catch hole formed so that the catch unit is inserted into a side of the hinge housing, wherein the catch unit includes a rod inserted into the hinge housing, and a catch step protruding to an outside of the center lid portion, and wherein the catch unit is configured to be moved integrally with the hinge housing when the hinge housing is moved in the width direction of the center lid portion in response to driving of the button unit, such that the catch step is inserted into the center lid portion integrally with the hinge housing fastened to the rod.

2. The two-way openable console of claim 1, further including:

an inlet portion located at an inner side of the side lid portions facing the center lid portion, and configured to be rotatably retracted into the side lid portions at a location corresponding to the catch step to prevent interference with the catch step.

3. The two-way openable console of claim 1, wherein the catch step protrudes to be adjacent to an inside of the side lid portions while being held on the side lid portions.

4. The two-way openable console of claim 1, further including:

a stopper unit located inside the center lid portion, and protruding to the outside of the center lid portion adjacent to the catch step.

5. The two-way openable console of claim 4, wherein the stopper unit located at a second end portion of the open center lid portion first contacts with the side lid portions to be inserted into the center lid portion, and is configured to restrict a movement of the rod.

6. A two-way openable console comprising:

side lid portions located on first and second sides of the two-way openable console;

a center lid portion located between the side lid portions to be operatively open about a first end of the center lid portion;

a button unit located on each of front and rear end portions of the center lid portion;

a rotation unit engaged to the button unit and rotated in response to an input of the button unit;

hinge units located on first and second end portions of the center lid portion, and configured so that the rotation unit is rotated in response to the input of the button unit and thereby center shafts protruding from first and second sides of the center lid portion are selectively retracted into the center lid portion;

a catch unit located adjacent to each of the hinge units, and integrally retracted in response to driving of each of the center shafts; and an opening striker located on the side lid portions, and configured to move up the center lid portion, wherein the catch unit includes a rod inserted into a hinge housing, and a catch step protruding to an outside of the center lid portion, and wherein the catch unit is configured to be moved integrally with the hinge housing when the hinge housing is moved in a width direction of the center lid portion in response to driving of the button unit, such that the catch step is inserted into the center lid portion integrally with the hinge housing fastened to the rod.

7. A two-way openable console comprising:

side lid portions located on first and second sides of the two-way openable console;

a center lid portion located between the side lid portions to be operatively open about a first end of the center lid portion;

a button unit located on each of front and rear end portions of the center lid portion;

a rotation unit engaged to the button unit and rotated in response to an input of the button unit;

hinge units located on first and second end portions of the center lid portion, and configured so that the rotation unit is rotated in response to the input of the button unit and thereby center shafts protruding from first and second sides of the center lid portion are selectively retracted into the center lid portion;

a catch unit located adjacent to each of the hinge units, and integrally retracted in response to driving of each of the center shafts; and a locking unit located on the center lid portion, and fastened to the button unit to be unlocked from the side lid portions in response to the input of the button unit, wherein the catch unit includes a rod inserted into a hinge housing, and a catch step protruding to an outside of the center lid portion, and wherein the catch unit is configured to be moved integrally with the hinge housing when the hinge housing is moved in a width direction of the center lid portion in response to driving of the button unit, such that the catch step is inserted into the center lid portion integrally with the hinge housing fastened to the rod.

8. The two-way openable console of claim 7, wherein the locking unit further includes:

a locking rod fastened to each of the button units located on the first and second end portions of the center lid portion; and a locking portion fastened to the locking rod to be selectively fastened to the side lid portions.

9. The two-way openable console of claim 8, wherein, in response that the input is applied to the button unit, an internal end portion of the locking rod fastened to each of the button units is moved to an adjacent location to limit driving of an adjacent locking rod.

10. A two-way openable console comprising:

side lid portions located on first and second sides of the two-way openable console;

a center lid portion located between the side lid portions to be operatively open about a first end of the center lid portion;

a button unit located on each of front and rear end portions of the center lid portion;

center shafts located on first and second end portions of the center lid portion to be inserted into the side lid portions;

hinge units configured so that the center shafts are selectively retracted into the center lid portion in response to an input of the button unit; and a catch unit located adjacent to each of the hinge units, and integrally retracted into the center lid portion in response to a movement of each of the center shafts, wherein each of the hinge units includes a hinge housing configured so that a corresponding center shaft among the center shafts is integrally moved in a direction facing the side lid portions, and a catch hole formed so that the catch unit is inserted into a side of the hinge housing, wherein the catch unit includes a rod inserted into the hinge housing, and a catch step protruding to an outside of the center lid portion, and wherein the catch unit is configured to be moved integrally with the hinge housing when the hinge housing is moved in a width direction of the center lid portion in response to driving of the button unit, such that the catch step is inserted into the center lid portion integrally with the hinge housing fastened to the rod.

11. The two-way openable console of claim 10, further including:

a rotation unit located between the button unit and the hinge unit in response to the input of the button unit.

12. The two-way openable console of claim 11, wherein the rotation unit transfers a movement of the button unit in a longitudinal direction of the center lid portion to a movement of the hinge units located on first and second sides of the center lid portion in a width direction thereof.

13. The two-way openable console of claim 12, further including:

an inlet portion located at an inner side of the side lid portions, and configured to be rotatably retracted into the side lid portions at a location corresponding to the catch step to prevent interference with the catch step.

14. The two-way openable console of claim 10, further including:

a locking unit located on the center lid portion, and fastened to the button unit to be unlocked from the side lid portions in response to the input of the button unit.

15. The two-way openable console of claim 14, wherein the locking unit further includes:

a locking rod fastened to each of the button units located on the first and second end portions of the center lid portion; and a locking portion fastened to the locking rod to be selectively fastened to the side lid portions, and wherein in response that the input is applied to the button units, an internal end portion of the locking rod fastened to each of the button units is moved to an adjacent location.

16. The two-way openable console of claim 15, wherein, in response that the input is applied to the button unit, the locking rod is moved in a longitudinal direction of the center lid portion, and the catch step located on the locking portion is moved in a width direction of the center lid portion, so that the locking portion fastened to the side lid portions is inserted into the center lid portion.

* * * * *